No. 831,472. PATENTED SEPT. 18, 1906.
C. H. RICHARDSON.
TRUCK.
APPLICATION FILED AUG. 31, 1905.
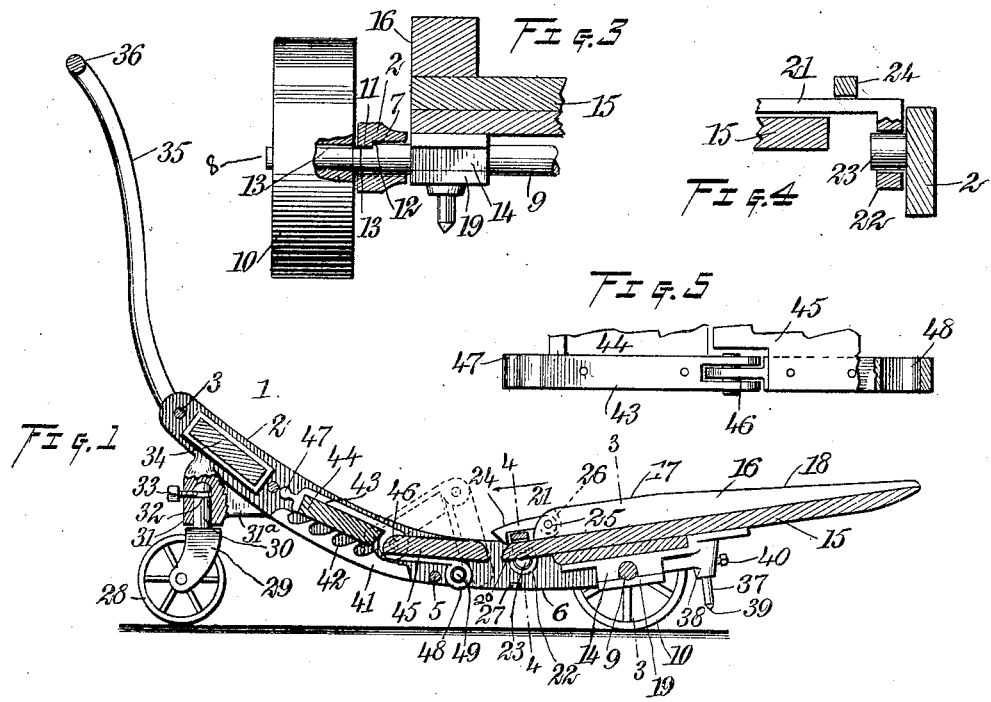
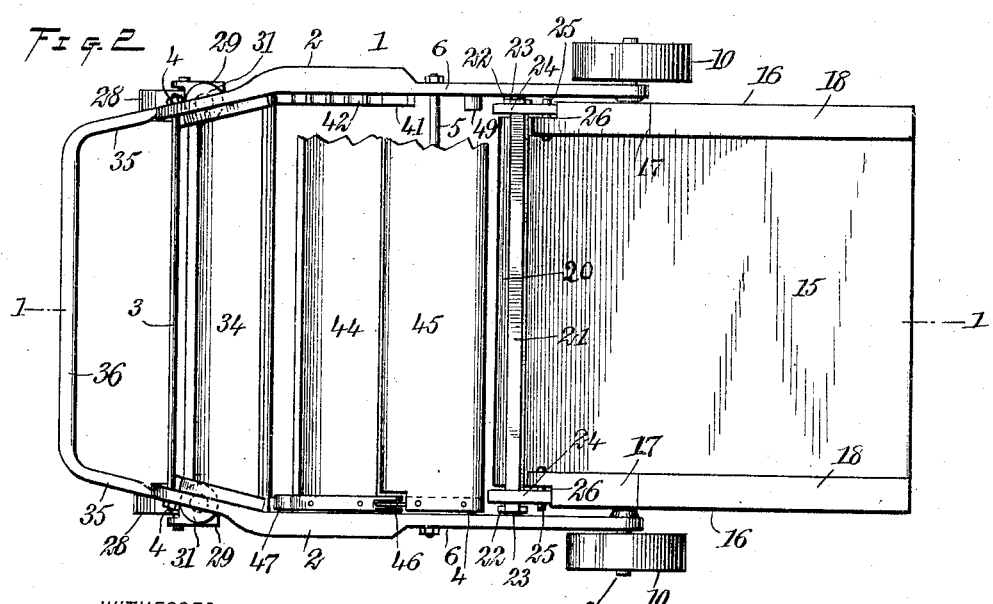
WITNESSES:
INVENTOR
Charles H. Richardson
BY
ATTORNEYS

UNITED STATES PATENT OFFICE.

CHARLES H. RICHARDSON, OF DOVER, NEW HAMPSHIRE.

TRUCK.

No. 831,472.　　Specification of Letters Patent.　　Patented Sept. 18, 1906.

Application filed August 31, 1905. Serial No. 276,582.

*To all whom it may concern:*

Be it known that I, CHARLES H. RICHARDSON, a citizen of the United States, and a resident of Dover, in the county of Stafford and State of New Hampshire, have invented a new and Improved Truck, of which the following is a full, clear, and exact description.

This invention relates to trucks; and it consists, substantially, in the details of construction and combinations of parts hereinafter more particularly described, and pointed out in the claims.

The invention has reference more especially to hand-trucks for barrels, boxes, and the like, though applicable to the handling of other kinds of freight or merchandise; and one of the principal objects thereof is to provide a structure of this kind which is simple in its embodiment and comparatively inexpensive to manufacture, besides being strong and easily handled, thoroughly effective and reliable for its purposes, and possessing the capacity for long and repeated service.

The above and additional objects are attained by means substantially such as are illustrated in the accompanying drawings, in which—

Figure 1 is a longitudinal sectional view of a hand-truck embodying my improvements. Fig. 2 is a top plan view thereof, partly broken out. Fig. 3 is an enlarged part-sectional detail view showing the construction and organization of certain parts, the section being on the line 3 3 of Fig. 1. Fig. 4 is a similar view of other parts and in section on the line 4 4 of Fig. 1. Fig. 5 is an enlarged part-sectional plan view in detail, indicating more clearly one manner of movably connecting together certain elements of the structure; and Fig. 6 is a side view in detail, illustrating a slight modification in the bearings for the movable platform of the structure.

Before proceeding with a more detailed description, it may be stated that in the form of my improvements herein shown I employ a truck comprising a specially-constructed body, to the forward portion of which is attached a forward or front platform of special construction, special means being employed for securing said platform in certain rigid relation to the body to thereby assist in maintaining the load upon the truck and for releasing the same when desired for the purpose of facilitating the unloading of the truck. A specially-constructed flooring is employed for the truck, together with means whereby the same may be adjusted and supported at varying inclinations to the forward end of the truck, thus to effectually operate as a chock to prevent the rolling of a barrel or the like beyond a desired point upon the truck, said feature of my improvements enabling both the position and center of weight of the load upon the truck to be adjusted at will with reference to the forward axle of the truck, thereby facilitating the unloading of the truck, as well as the more easy rolling or propelling of the same, without liability to shifting of the load thereon, especially when the load is made up of one or more barrels, boxes, or the like.

Special means are employed in connection with the body of the truck by which to firmly support said specially-constructed flooring either when employed as such or as a chock for the purpose described, other special means being employed by which the forward or main supporting-wheels of the truck are caused to always remain upon the ground or other surface irrespective of whether the forward platform is in its lowered position for unloading the truck or in the position normally occupied thereby when the truck is loaded.

Reference being had to the drawings by the designating characters thereon, 1 represents the main body of my improved truck in its entirety, the same being constructed of parallel side members 2 of suitable dimensions and curvature, said members being connected together at or near the rearward ends thereof by means of a connecting brace or rod 3, secured at the ends by suitable nuts 4, together with another connecting brace or rod 5, extending between the practically horizontal portions 6 of the members, substantially as indicated in Figs. 1 and 2. Said members are provided at the forward ends thereof with holes or openings 7, (see Fig. 3,) through which extend the end portions 8 of the transversely-disposed axle 9 of the main supporting-wheels 10 for the structure, it being observed that each of said holes or openings is cast or otherwise formed with a substantially transverse bar 11, extending partly thereinto and adapted to engage with a shoulder 12, formed by flattening the near end portion of the axle, substantially as indicated at 13. In this way the forward ends of the parallel members 2 of the truck are firmly braced at such ends, and the axle 9 is also given such support endwise as that the main supporting-wheels 10 of the structure are maintained in proper position relatively to the main body, as will be apparent. In this way also a more perfect rolling of the said supporting-wheels is had without tendency to binding upon the axle, thus enabling the truck to be the more readily propelled when loaded. Mounted upon the said axle 9 for the main supporting-wheels 10 are bearings 14 for a forward platform 15, having side flanges or members 16, which for a certain distance from the rearward end of said platform are preferably substantially straight, as indicated at 17, and which for the greater part of their length, however, are preferably beveled or inclined downwardly and forwardly, as indicated at 18. Said bearings 14, as shown in Fig. 1, are each provided with a closing or cap plate 19, thus enabling the platform 15 to be tilted forwardly or rearwardly on said axle 9, as will be apparent, and for the purpose of securing this platform rigidly in the position shown in Fig. 1, or when the same is in its upward or elevated position, I preferably extend the rearward end 20 thereof somewhat beyond the rear ends of the hereinbefore-mentioned flanges or side members 16 of the platform and provide any suitable means for engaging said rearward end—such, for example, as a swinging yoke 21, having end portions 22 thereof movably mounted or supported upon bosses or offsets 23, projecting from the inner surfaces of the said parallel side members 2 of the truck, said yoke being engaged by means of catches 24, pivoted at 25 within recesses 26, preferably formed therefor within the inner surfaces of the said flanges or side members 16 of the platform 15. When the catches 24 are engaged with the said swinging yoke 21, as indicated in Fig. 1, it is apparent that the platform 15 will be firmly and rigidly held in relation to the main body of the truck, and whenever it is desired to release the catches 24 from the said swinging yoke 21 it is simply necessary to raise the forward end of the platform 15, whereupon the catches will be elevated or raised and the swinging yoke will automatically drop to a position of rest upon opposite lugs or projections 27 from the inner side of the horizontal portions of the parallel members 2 of the truck, as shown in Figs. 1 and 2. The main body of the truck is provided with caster-wheels 28, which may be supported with reference to the parallel side members 2 of the truck in any suitable manner; but preferably I employ for each of them a hanger or bearing 29, provided at the upper part thereof with a spindle 30, which is received in a socket 31 therefor, preferably cast as an integral part with one of the side members 2, said spindle being formed with an annular groove 32, in which is received the end of a set-screw 33 for rotatably maintaining the spindle within the socket, thus to enable the caster-wheel to readily turn in conformity with any turn of direction given to the main supporting-wheels 10. It is apparent that the caster-wheels could be mounted with reference to the main body of the truck in other ways; but from the construction herein shown more perfect results are to be had at less expense, and the said caster-wheels thereby brought more nearly into alinement with the said supporting-wheels 10. Each socket 31 intersects with the lower edge of the corresponding member 2 by a connecting-web 31$^a$, as shown. The parallel members 2 of the main body of the truck are preferably connected at or near the rearward ends thereof by means of a comparatively wide brace 34, and it will be noted that such ends have secured thereto in any suitable way the ends of the side portions 35 of a handle 36 for the structure. Said forward platform 15 is preferably provided at the under side thereof with props 37, which may be secured in place in any suitable manner, but which are each preferably herein shown as adjustably held or secured within a socket 38 therefor, forming an integral part of the bearing 14, corresponding thereto and extending forwardly thereof, (see Fig. 1,) said prop being preferably provided at the end thereof with a cushioned tip 39 and held in any desired position of adjustment by means of a set-screw 40, working in a suitable opening therefor provided in the socket. As will be observed, the said catches 24 for engaging the swinging yoke 21 are preferably located with their outer faces substantially flush or in alinement with the outer faces of the said flanges or side members 16 of the forward platform 15, although said catches may be located at the inner surfaces of the flanges or side members, as is apparent. The opposite inner surfaces of said parallel members 2 of the main body of the structure are provided with inwardly-projecting flanges or plates 41, formed in the upper edges thereof with a plurality of notches 42, said upper edges serving as supports for the side members 43 of the rearward section 44 of a platform or flooring for the structure, comprising also another section 45, hinged or otherwise connected to the first-named section 44 at 46, thus rendering the flooring of a collapsible nature and enabling the two sections thereof to be carried outwardly from each other in such manner as to form practically a continuous structure occupying, preferably, an inclined position upwardly and rearwardly between the parallel side members 2 of the body, as will be understood on reference to Fig. 1. The said side members 43 of the said rearward section 44 of the flooring are each provided at the rearward end thereof with a headed pin or projection 47, adapted to be received in either one of the notches 42 of the flange or plate 41, corresponding thereto, thus to support the two said sections of the flooring in reversely-inclined positions between the said parallel members 2 of the main body, substantially as indicated by dotted lines in Fig. 1, the forward faces of the section 45 of the flooring being in this way made to subserve the function of a chock-block, against which barrels, boxes, or the like may be supported or braced when placed upon the forward platform 15, thus to tend to dispose the weight of the load upon the truck as much as possible upon the said axle 9 of the supporting-wheels 10 of the structure.

From the construction and organization of the parts just described it will be seen that the sections of the flooring may be set or adjusted at varying inclinations, according to the different requirements in use, and it will be seen also that when the said sections are again straightened out the two sections will be firmly supported substantially in the manner just explained. The forward section 45 of this flooring is provided on the under side thereof at or near its forward edge at opposite sides with projections 48, having openings therein for receiving bosses or pins 49, extending inwardly from the inner surfaces of the horizontal portions of the parallel members 2 of the body, it being in this way that practically a hinged support for the flooring is provided to enable the sections thereof to be swung upwardly and adjusted in the manner and for the purpose set forth. It is apparent that the side members 43 are not essential to the construction of the rearward section 44 of the movable flooring, since the headed pins or projections thereon could extend from the rearward edge of said section itself and still be operative for all the purposes for which they are employed.

From the foregoing description it will be seen that whenever the structure is tilted or elevated from the rear in a manner to carry the forward edge of the platform 15 toward or in the direction of the surface of the ground the bearings 14 for the platform will be partially rotated about the axle 9 for the supporting-wheels 10 of the structure, and so too will the same operation take place whenever the movable platform is lowered or raised independently of any raising of the main body of the machine; but in instances where the forward edge of the platform 15 is carried all the way to the ground, thus to cause the props 37 to find a support upon the ground, the supporting-wheels 10 for the structure will also be somewhat elevated from the ground. This raising of the said supporting-wheels is not attended with objection except in certain instances, and for the purpose of enabling the platform 15 to be either raised or lowered at its forward edge without causing the wheels 10 to become elevated from the ground I prefer in some instances to provide each bearing 14 and capplate 50 with a vertically-disposed bearing-slot 51, which enables all the desired movements of the platform 15 to be carried out without causing the supporting-wheels 10 of the structure to be raised from the ground, since it is apparent that the platform is thereby permitted to have a slightly-independent movement upwardly with respect to the axle 9, according as the platform is carried upwardly or downwardly in the manner explained. It will be understood that the lowering of the platform 15 is only effected at such times as when the structure is in a position of rest, and therefore this independent movement of the platform does not in any manner interfere with the ordinary functions of the supporting-wheels as such.

From the foregoing it will be seen that in the loaded condition of the truck the weight of the load will be carried mainly upon the supporting-wheels 10 thereof and also that in virtue of the described construction of the side members 16 of the platform 15 whenever a barrel or the like is rolled onto the platform the middle or larger diameter of the barrel will be freely accommodated between the said side members 16, thus greatly reducing the inclination necessary to be given to the platform to cause the barrel to roll into proper position upon the truck. This enables the loading of the truck to be carried out very easily, and it will be seen that the upper part of the load of barrels or boxes will be caused to bind in such a manner as to tend to keep the load in position upon the truck.

When it is desired to load a heavy barrel that is closed at each end upon the truck, the hinged flooring 44 and 45 may be adjusted, as shown by dotted lines in Fig. 1, to receive and arrest the barrel, and by simply raising the front end of the platform 15 and letting go of the same the truck is ready to receive the barrel, presenting an inclined platform, its front edge resting upon the floor and supported upon prop-legs rearwardly of such length and position forwardly of the axle as to hold the same with its wheels somewhat above the floor and independent of them for support.

The length of the platform is such that it affords an easy inclined plane up which a barrel or large bale of goods may be rolled, and it may be seen that the enforced contact of the prop-legs 37 with the floor will prevent the truck from moving away while the barrel is being loaded. When the barrel has been rolled upward until it passes over the prop-legs 37, the platform 15 will begin to assume a more nearly level position, carrying the wheels to the floor, and as the barrel passes the axle the inclination of the platform will automatically be reversed and the barrel at rest will be chocked upon the truck within the angle of the oppositely-inclined floorings.

In order to effect the unloading of the truck, it is simply necessary to slightly elevate the rearward portion of the main body thereof by means of the handle 36, whereupon the barrel will be easily started and, if desirable, may be guided downwardly from the platform 15 by hand.

Whenever the two sections of the flooring located between the parallel side members 2 of the main body of the truck are straightened out, it will be seen that the truck may then be conveniently employed for carrying loads of sacks of meal or other material, which may be piled upon the truck to any desired height and practically as far to the rear as the handle 36 itself.

Having thus described the invention, what I claim as new, and desire to secure by Letters Patent, is—

1. A truck for barrels and the like, comprising a tiltable platform at the forward end thereof, and means for detachably securing the same in a forwardly and upwardly inclined position, embodying a swinging yoke on the truck and catches therefor on the platform.

2. A truck for barrels and the like, comprising a tiltable platform at the forward end thereof, and means for detachably securing the same in a forwardly and upwardly inclined position, embodying a swinging yoke on the truck and means for engaging the same above the rearward end of the platform.

3. A truck for barrels and the like, comprising a tiltable platform at the forward end thereof, and means for detachably securing the same in a forwardly and upwardly inclined position, embodying a swinging yoke on the body of the truck and pivoted catches on the platform adapted to engage therewith.

4. A truck for barrels and the like, comprising a main body, a tiltable forward platform, props on the platform, and means for adjusting the props whereby they may engage the surface upon which the truck is supported when the platform is tilted.

5. A truck for barrels and the like, comprising a main body, supporting-wheels therefor, and an axle for the wheels, a tiltable forward platform having bearings mounted upon said axle, and means for securing the platform in a forwardly and upwardly inclined position, embodying a swinging yoke on the truck and catches on the platform for engaging the yoke.

6. A truck for barrels and the like comprising a main body, supporting-wheels therefor, and an axle for the wheels, a tiltable forward platform having bearings mounted upon said axle, and means for securing the platform in a forwardly and upwardly inclined position, said bearings being provided with integral sockets carrying props for the platform.

7. A truck for barrels and the like comprising a main body, supporting-wheels therefor, and an axle for the wheels, a tiltable forward platform having bearings mounted upon said axle, and means for securing the platform in a forwardly and upwardly inclined position, said bearings being constructed with vertical slots through which the axle extends.

8. A truck for barrels and the like, comprising a main body constructed of parallel side members and connecting-braces therebetween, said members being formed with integral sockets on the under sides thereof and having supporting-wheels at their forward ends, and caster-wheels having supporting-brackets provided with spindles rotatably inserted within said sockets, said spindles each being formed with an annular groove, and each of the sockets having a set-screw with the inner end thereof entering the groove.

9. A truck for barrels and the like, comprising a main body, supporting-wheels therefor having an axle, and a tiltable platform at the forward end of the body provided with bearings mounted on the axle and provided with forwardly-disposed sockets integral therewith and carrying props for the platform.

10. In a truck for barrels and the like, a flooring comprising a plurality of sections hinged to each other, one of said sections being hinged to the truck, and means for supporting the same at an inclination with reference to the forward end of the truck.

11. In a truck for barrels and the like, a flooring comprising a plurality of transversely-arranged sections hinged to each other, one of said sections being hinged to the truck, and means for supporting the same at an inclination with reference to the forward end of the truck.

12. A truck for barrels and the like comprising a flooring constructed of a forward section and a rearward section hinged thereto, and hinged supports for the forward edge of the forward section to support the forward section at an inclination with respect to the forward end of the truck.

13. A truck for barrels and the like, comprising a main body constructed of parallel side members having supporting-wheels, said members being provided on the inner surface thereof with inwardly-projecting flanges having corresponding notches in the upper edges thereof, a platform movably supported forwardly of the truck, and a hinged flooring embodying two sections hinged together and disposed forwardly and rearwardly of the structure, the rearward section having means for entering the corresponding ones of the notches to secure the forward section in an inclined position with respect to the forward end of the truck.

14. A truck for barrels and the like comprising a main body constructed of parallel members, and braces therebetween, said members being provided at their forward ends with openings, and supporting-wheels upon the truck having an axle extending through the openings, said members being formed with projections extending within the openings, and the end portions of said axle being flattened and constructed with notches corresponding to said projections.

In testimony whereof I have signed my name to this specification in the presence of two subscribing witnesses.

CHARLES H. RICHARDSON.

Witnesses:
WILLIAM H. ROBERTS,
ETTA M. HAYES.